United States Patent
Sakti et al.

[11] Patent Number: 5,909,095
[45] Date of Patent: Jun. 1, 1999

[54] BEMF ZERO-CROSSING DETECTION SYSTEM OF A MULTIPLE-PHASE MOTOR

[75] Inventors: Rana Sakti; Keng-Kwok Chow, both of Singapore, Singapore

[73] Assignee: STMicroelectronics Asia Pacific Ltd., Singapore, Singapore

[21] Appl. No.: 08/904,420

[22] Filed: Jul. 31, 1997

[30] Foreign Application Priority Data

Jul. 31, 1996 [FR] France .................................. 96/09880

[51] Int. Cl.$^6$ ................................ G05B 5/01; H02P 5/40
[52] U.S. Cl. .......................... 318/254; 318/590; 318/591
[58] Field of Search ..................... 318/138, 139, 318/245, 254, 280–283, 599, 590, 591, 611, 632, 811, 820

[56] References Cited

U.S. PATENT DOCUMENTS

| | | | |
|---|---|---|---|
| 4,065,074 | 12/1977 | Anderson et al. ....................... | 242/184 |
| 4,250,435 | 2/1981 | Alley et al. .............................. | 318/138 |
| 4,300,081 | 11/1981 | Van Landingham ..................... | 318/599 |
| 4,642,537 | 2/1987 | Young ..................................... | 318/254 |
| 4,851,744 | 7/1989 | Kotzur et al. ........................... | 388/815 |
| 4,893,067 | 1/1990 | Bhagwat et al. ........................ | 388/817 |
| 4,928,043 | 5/1990 | Plunkett ................................. | 318/254 |
| 5,017,845 | 5/1991 | Carobolante et al. ................... | 318/138 |
| 5,079,494 | 1/1992 | Reichard ................................. | 318/811 |
| 5,172,036 | 12/1992 | Cameron ................................. | 318/138 |
| 5,198,733 | 3/1993 | Wright .................................... | 318/254 |
| 5,221,881 | 6/1993 | Cameron ................................. | 318/254 |
| 5,245,256 | 9/1993 | Cassat et al. ............................ | 318/254 |
| 5,285,135 | 2/1994 | Carobolante et al. ................... | 318/254 |
| 5,294,877 | 3/1994 | Cameron ................................. | 318/809 |
| 5,306,988 | 4/1994 | Carobolante et al. ................... | 318/254 |
| 5,317,243 | 5/1994 | Cameron ................................. | 318/254 |
| 5,350,984 | 9/1994 | Carobolante ............................ | 318/254 |
| 5,434,492 | 7/1995 | Hilaire et al. ........................... | 318/717 |
| 5,506,487 | 4/1996 | Young et al. ............................ | 318/811 |
| 5,517,095 | 5/1996 | Carobolante et al. ................... | 318/254 |
| 5,723,963 | 3/1998 | Li et al. .................................. | 318/590 |

OTHER PUBLICATIONS

Arefeen, M.S. et al., "Elimination Of Discrete Position Sensor For Synchronous Reluctance Motor," in PESC 93 Record of the 24$^{th}$ Annual IEEE Power Electronics Specialists Conference, Seattle, WA, June 20–25, 1993, pp. 440–445.

SGS–Thomson Microelectronics, "*12V Sensorless Spindle Motor Controller,*" bearing an internal date of Dec. 7, 1994, but publicly disclosed later.

*Primary Examiner*—Paul Ip
*Attorney, Agent, or Firm*—David V. Carlson; Frederick M. Fliegel; Seed & Berry LLP

[57] ABSTRACT

The invention relates to a method for detecting a threshold-crossing of a back electromotive force (bemf) measured in one phase of a multiple-phase motor, the one phase being set at a high impedance while at least one other phase is supplied by pulse-width modulation signal. The method includes the step of comparing the bemf with a threshold. The method includes, prior to the step of comparing, the steps of sampling the bemf during on-periods of the pulse-width modulation signal, and holding the bemf during off-periods of the pulse-width modulation signal.

18 Claims, 2 Drawing Sheets

5,909,095

BEMF ZERO-CROSSING DETECTION SYSTEM OF A MULTIPLE-PHASE MOTOR

TECHNICAL FIELD

The present invention relates to a multiple-phase synchronous motor, such as a three-phase spindle motor of a hard disk drive. The invention more particularly relates to a method of controlling the speed of a three-phase motor by detecting a zero-crossing of the back electromotive force (bemf) in one phase of the motor.

BACKGROUND OF THE INVENTION

FIG. 1 schematically shows the connections of three phases of a conventional hard disk drive spindle motor. The motor comprises three windings WA, WB and WC, each having one terminal connected to a common center tap N. Three remaining terminals A, B and C of the three windings, respectively, are controlled by a three-phase switch bridge. Each of the terminals A, B and C is coupled to a low supply voltage GND through a low side switch SL, and is also coupled to a high supply voltage Vcc through a high side switch SH.

FIG. 2A shows exemplary voltage waveforms at the terminals A, B and C, illustrating a conventional control cycle for the switches SH and SL coupled to each of the terminals A, B, and C. Each of the terminals A, B and C is successively connected to the voltage Vcc when SH=1 and SL=0, and then is set at a high impedance or "tri-stated" when SH=0 and SL=0, and is finally connected to the low voltage GND when SH=0 and SL=1. As shown in FIG. 2A, the time intervals in which the terminals A, B, or C are connected to the voltage Vcc or to the low voltage GND are twice as long as the time intervals in which the terminals A, B, or C are tri-stated. Furthermore, the control cycles of the terminals B and C are phase shifted by 120° and 240°, respectively, relative to the control cycle of the terminal A, so that, for each sixth of a full switching cycle, while one winding is in turn tri-stated, the two other windings are connected in series between the voltages Vcc and GND.

The voltage across the winding which is tri-stated is representative of the bemf of the motor. This voltage is measured and its zero-crossing, relative to the voltage at the center tap N, is detected to provide information of the speed of the motor which is used for servo-controlling the motor. As shown, the voltage at the terminal of a tri-stated phase begins with a spike due to inductive recirculation and continues with an increasing or decreasing portion of a sinusoid. The zero-crossing detection is enabled only during the sinusoidal portions.

In low power motors, the speed of the motor is adjusted by varying the conductance of the high side switches SH or the low side switches SL. This method of speed control causes a power loss in the switches which may be acceptable for low power motors but becomes excessive in higher power motors.

To reduce the power losses, the switches SH and SL are controlled to be switched on and off by a pulse-width modulation signal. However, control of the switches SH and SL by a pulse-width modulation signal affects the reliable detection of the bemf zero-crossings.

FIG. 2B illustrates an enlarged portion of the waveform shown in FIG. 2A, in a case where a pulse-width modulation signal is used to control the switches SH and SL. During the supply time interval of a pair of the windings, the voltage at one terminal of the pair of windings is chopped between the voltages Vcc and GND. When this terminal is tri-stated, its voltage is affected by the chopping which continues on the next terminal. As shown, the voltage at this terminal is chopped between the bemf value and a lower value. A false zero-crossing detection occurs at a time $t_1$ well before the zero-crossing of the bemf which occurs at a time $t_0$.

Some circuits, like circuit L6232B manufactured by SGS-Thomson Microelectronics, regulate the nominal speed of a motor by adjusting the conductance of the low side switches SL and, when the motor is started, the circuits use a pulse-width modulation signal in order to reduce the current drawn from the power supply. As indicated above, these circuits are only adapted to low power motors.

SUMMARY OF THE INVENTION

According to principles of the present invention a bemf zero-crossing detection system is provided which operates conveniently with a pulse-width modulated speed regulation of a multiple-phase synchronous motor. Such a system controls high power synchronous motors with low power losses.

A method according to principles of the present invention provides for detecting a threshold-crossing of the back electromotive force measured in one phase of a multiple-phase motor while the phase is set at a high impedance and at least one other phase is supplied by a pulse-width modulation signal, by comparing the bemf with the threshold. Prior to the step of comparing, the method includes the steps of sampling the bemf during on-periods of the pulse-width modulation signal, and holding the bemf during off-periods of the pulse-width modulation signal.

According to an embodiment of the invention, the sampling and holding steps are carried out with a capacitor, and the method includes the step of modifying the charge of the capacitor during an off-period of the pulse-width modulation signal, so that the voltage on the capacitor substantially equals the bemf value at the beginning of the next on-period of the pulse-width modulation signal.

According to an embodiment of the invention, the method includes the step of forcing an on-period of the pulse-width modulation signal in a window where the bemf is likely to cross the threshold.

According to an embodiment of the invention, the window ends at a threshold-crossing detection.

According to an embodiment of the invention, the method includes the step of using the window only for a first threshold-crossing detection.

According to principles of the present invention, a control device is provided for a multiple-phase motor in which one phase is set at a high impedance for measuring the back electromotive force of the motor while at least one other phase is supplied by pulse-width modulation signal. The control device includes a comparator for detecting the bemf crossing a threshold, and a sample and hold circuit operative for sampling the bemf during on-periods of the pulse-width modulation signal and holding the bemf during off-periods of the pulse-width modulation signal, the comparator receiving the output of the sample and hold circuit.

According to an embodiment of the invention, the sample and hold circuit includes a sample and hold capacitor, and the control device includes a circuit for modifying the charge of the capacitor, so that the voltage of the capacitor during an off-period of the pulse-width modulation signal substantially equals the bemf value at the beginning of the next on-period of the pulse-width modulation signal.

According to an embodiment of the invention, the control device includes a window comparator for forcing an on-period of the pulse-width modulation signal in a window where the bemf is likely to cross the threshold.

According to an embodiment of the invention, the circuit for modifying the charge includes a current source, such as a resistor, connected between the capacitor and an appropriate voltage during the off-periods of the pulse-width modulation signal.

The foregoing and other objects, features, aspects and advantages of the invention will become apparent from the following detailed description of the present invention when taken in conjunction with the accompanying drawings.

DESCRIPTION OF THE PREFERRED EMBODIMENTS

Figure 3:
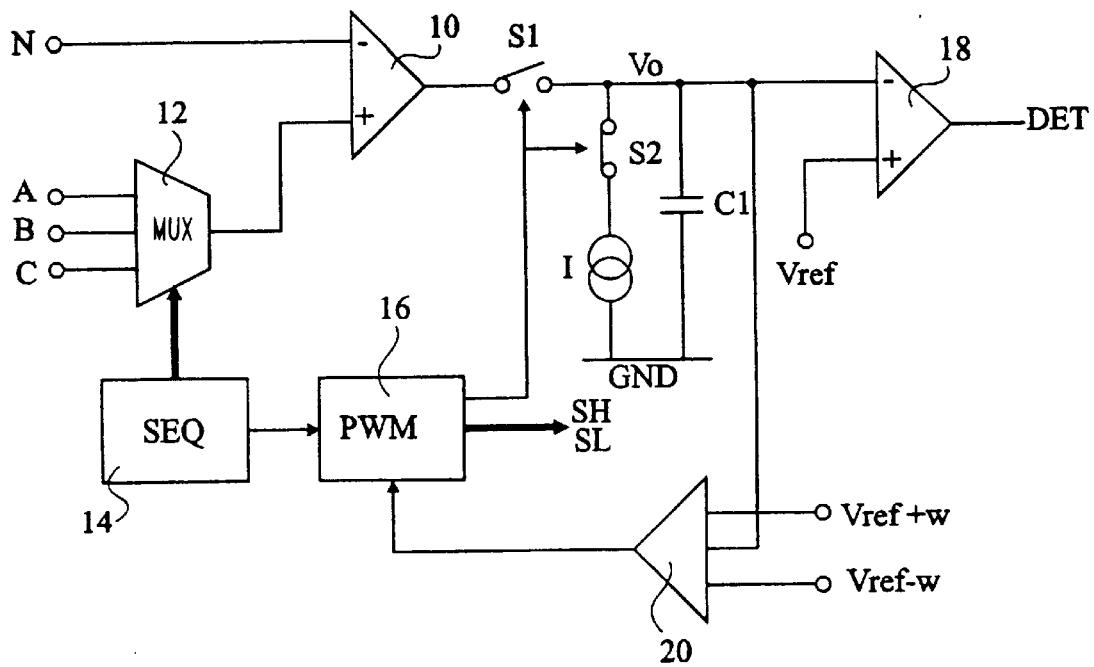
FIG. 3 schematically shows an embodiment of a bemf zero-crossing detection system according to the invention.

A bemf zero-crossing detection system according to a first embodiment of the invention is shown in FIG. 3. An inverting input of a differential amplifier 10 receives a voltage at a center tap N of three windings of a synchronous motor of the type shown in FIG. 1. A non-inverting input of the differential amplifier 10 receives an output of an analog multiplexer 12 which is controlled by a sequencer 14 to select, among the terminals A, B and C of the motor the one which is tri-stated.

Figure 2A:
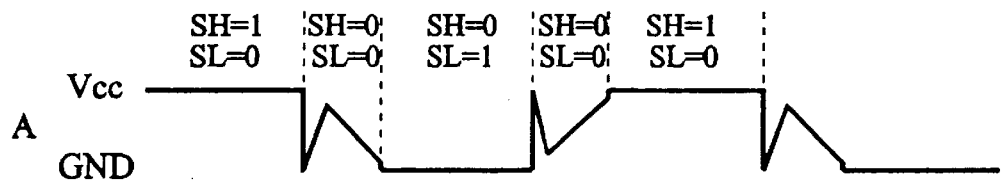
Figure 2A:
Figure 2A:

The sequencer 14 determines the switching sequence of the switches SH and SL of the motor in order to produce the waveforms of FIG. 2A. The switches SH and SL are effectively controlled by the sequencer 14 through a pulse-width modulator 16 which adjusts the current in the windings of the motor with a pulse-width modulation signal in order to regulate the speed of the motor. The pulse-width modulator 16 is always operative, even at a nominal speed of the motor.

Figure 1:
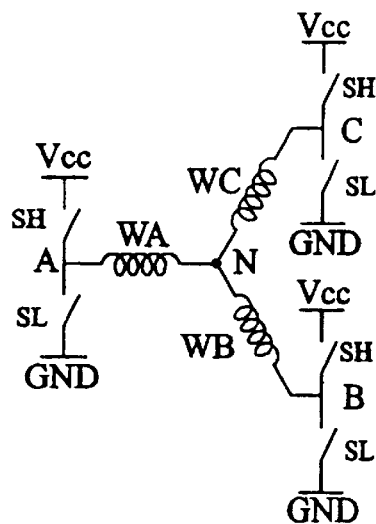
FIGS. 1, 2A, and 2B illustrate a three-phase motor and its operation according to the prior art.

According to the first embodiment of the invention, an output of the differential amplifier 10 is provided to a sample and hold circuit including a switch S1 and a capacitor C1. A first terminal of the capacitor C1 is connected to a constant voltage, for example a low supply voltage GND. A second terminal of the capacitor C1, from which voltage is taken, is connected to the output of the differential amplifier 10 through the switch S1. The switch S1 is controlled by the pulse-width modulator 16 so that it turns on each time a high side switch SH or a low side switch SL of the switch bridge shown in FIG. 1 is turned on. The switch S1 is turned on during each on-period of the pulse-width modulation signal where a current is forced through two of the windings of the motor. A voltage across the winding of the motor which is tri-stated is then sampled by the capacitor C1. During each off-period of the pulse-width modulation signal, i.e., when no current is forced through the windings of the motor, the switch S1 is turned off such that the capacitor C1 holds the voltage $V_0$ reached in the tri-stated winding.

The sample and hold voltage $V_0$ is provided to an inverting input of a comparator 18. A non-inverting input of the comparator 18 receives a reference voltage Vref which is equal to the value of the voltage $V_0$ at the zero-crossing of the bemf. For example, Vref=Vcc/2 if the impedances of the windings of the motor are equal. The comparator 18 provides a detection signal DET which goes high as soon as the voltage $V_0$ goes below the voltage Vref. Thus, the comparator 18 provides a zero-crossing point detection with each edge of the detection signal DET. A rising edge for a decreasing bemf indicates a zero-crossing point and a falling edge for an increasing bemf indicates a zero-crossing point. These rising or falling edges of the detection signal DET are taken into account for determining the speed of the motor outside the time intervals where spikes caused by inductive recirculation are likely to occur. Preferably, the comparator 18 is provided with a slight hysteresis to avoid a generation of spurious edges near the zero-crossing point due to noise.

Figure 4:
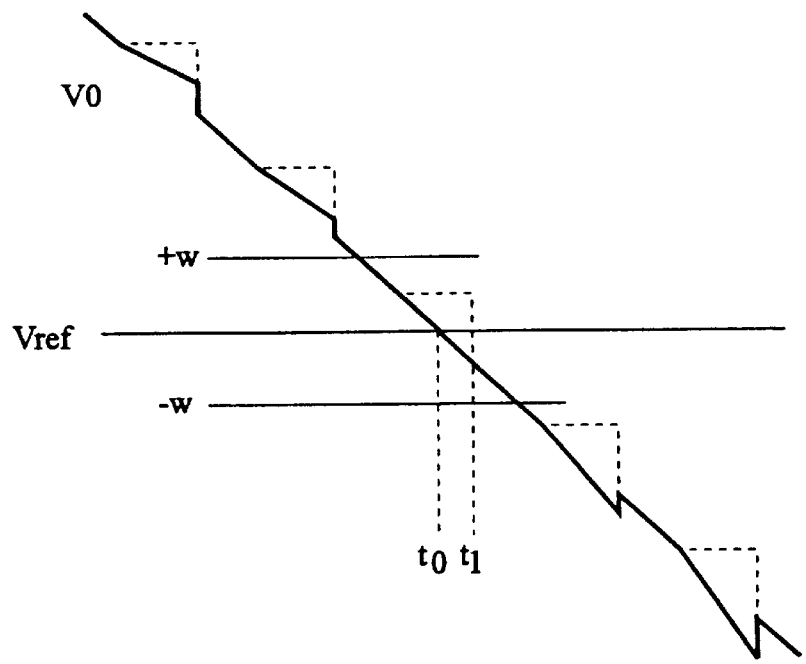
FIG. 4 shows an enlarged waveform of the bemf voltage as processed by the system of FIG. 3, in the vicinity of its zero-crossing point.

FIG. 4 shows, in dotted lines, a plot of the sample and hold voltage $V_0$ for a decreasing bemf according to the first embodiment of the invention described up to now. During the on-periods of the pulse-width modulation signal, the voltage $V_0$ follows the bemf of the motor. During the off-periods of the pulse-width modulation signal, the voltage $V_0$ stays constant, and thus departs from the bemf of the motor for the entire off-period. At the beginning of the next on-period, the capacitor C1 is abruptly discharged down to the value of the bemf.

Figure 2B:
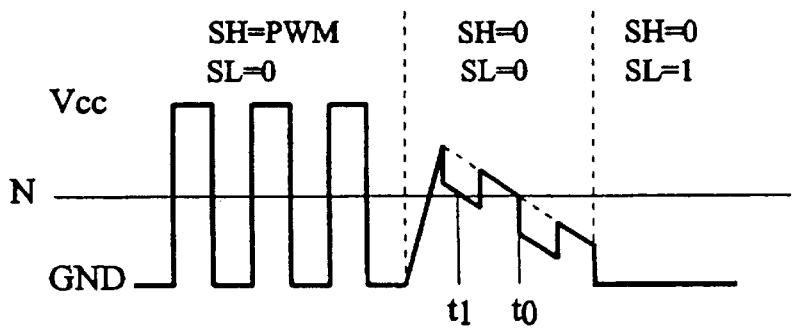

With this operation, if a zero-crossing of the bemf occurs at a time $t_0$ during an off-period of the pulse-width modulation signal, as shown in FIG. 4, a false detection will occur at a time $t_1$ at the beginning of the next on-period. The error between the false detection and the correct detection is at most equal to an off-period of the pulse-width modulation signal whereas, in the operation of the conventional motor shown in FIG. 2B, the error could be of several pulse-width modulation signal periods.

According to a second embodiment of the invention, the accuracy of the zero-crossing detection is further improved by a slope compensation circuit including a switch S2 and a current source I connected in series between the sample and hold voltage $V_0$ and the low supply voltage GND. The switch S2 is controlled in phase opposition to the switch S1, such that the capacitor C1 is discharged through the current source I during each off-period of the pulse-width modulation signal.

A corresponding evolution of the sample and hold voltage $V_0$ is illustrated in full lines in FIG. 4. During the on-periods of the pulse-width modulation signal, the voltage $V_0$ follows the bemf of the motor. During the off-periods, the capacitor C1 is discharged through the current source I such that the voltage $V_0$ decreases. Preferably, the values of the capacitor C1 and the current source 1 are chosen such that the voltage $V_0$ substantially follows the bemf of the motor during the off-periods of the pulse-width modulation signal.

The bemf of the motor has a sinusoidal shape of the form A sinωt, where is the amplitude of the bemf and ω is the angular speed of the motor in radians per second. The values of the capacitor C1 and the current source I are chosen to obtain the best slope compensation in the vicinity of the bemf zero-crossing point at a nominal speed of the motor. This is obtained when I/C1=Aω. Then, as shown in FIG. 4, in the vicinity of the zero-crossing point at the time $t_0$, the voltage $V_0$ evolves with a smooth transition between the off and on-periods of the pulse-width modulation signal. As the distance increases between the zero-crossing point and the off-period, the accuracy of the slope compensation provided by the slope compensation circuit decreases, which results in an increasing step in the voltage $V_0$ between the off-period and the next on-period. This has no consequence for the accuracy of the speed regulation, because the zero-crossing point is detected at the point where the slope compensation is most accurate.

The slope compensation circuit of FIG. 3 is designed for a decreasing bemf. For an increasing bemf, the current source I will be connected to the high voltage Vcc.

The current source I may be replaced by a resistor having a value equal to Vref/I.

The slope compensation circuit according to the second embodiment of the invention, which has just been described, is designed for a motor turning at a constant nominal speed and will loose its accuracy at a different speed. In particular, the slope compensation circuit will be inaccurate when the motor is in its starting phase, which will cause jitter in the motor until the nominal speed is reached.

If it is desired to avoid this, the circuit of FIG. 3 may be provided, according to a third embodiment of the invention, with a window comparator 20 which forces the pulse-width modulator 16 to an on-mode when the sample and hold voltage $V_0$ is likely to cross the voltage Vref. A window framing the zero-crossing point is defined for the window comparator 20 by two voltage values Vref+w and Vref−w. Therefore, within the window Vref±w, the voltage $V_0$ will exactly represent the bemf of the motor and ensure an accurate zero-crossing point detection.

The window comparator 20 is enabled (i.e. allowed to force the pulse-width modulator 16 into the on-mode) when the motor is started, and disabled once a zero-crossing point has been detected within the window.

In an alternative embodiment, for a decreasing bemf, the second limit Vref−w of the window is omitted, and the window is defined by a predetermined time interval starting at the moment when the voltage $V_0$ reaches the first limit Vref+w.

In another alternative embodiment, the second limit of the window is selected as the moment when a zero-crossing point is detected, so that the pulse-width modulator 16 is allowed to switch to an off-mode immediately after the zero-crossing point detection. This embodiment provides for a better continuity in the pulse-width regulation of the motor.

A method and an apparatus for detecting zero-crossing points for a multi-phase synchronous motor have been described. The details of well known circuits such as a current source, a differential amplifier, an analog multiplexer, a sequencer, and a pulse width modulator have not been shown in detail in order not to unnecessarily obscure the invention. In addition, it will be appreciated that, although several embodiments of the invention have been described above for purposes of illustration, various modifications may be made without deviating from the spirit and scope of the invention. For example, the switches in the motor may be comprised of any type of well known transistor such as an N-channel DMOS transistor, a P-channel DMOS transistor, or a BJT transistor. Numerous variations are well within the scope of this invention. Accordingly, the invention is not limited except as by the appended claims.

We claim:

1. A circuit for detecting a zero-crossing point for a bemf voltage in a multiple-phase synchronous motor including a plurality of coils, the coils being driven by a PWM signal having on-periods and off-periods, the motor having a center tap with a center tap voltage, the bemf voltage being sensed in a selected one of the coils, the circuit comprising:

a sample and hold circuit being coupled to the selected coil during on-periods of the PWM signal to receive the bemf voltage from the selected coil and hold it as a sampled voltage, the sample and hold circuit being isolated from the selected coil during off-periods of the PWM signal to hold the sampled voltage received during on-periods of the PWM signal; and a comparing circuit having first and second inputs, the first input being coupled to the sample and hold circuit to receive the sampled voltage, the second input receiving a reference voltage, the comparing circuit generating a zero-crossing detection signal when the sampled voltage equals the reference voltage.

2. The circuit of claim 1, further comprising an amplifier having first and second inputs and an output, the first input being coupled to the center tap to receive the center tap voltage, the second input being coupled to the selected coil to receive the bemf voltage, the amplifier generating at its output an amplified voltage proportional to a difference between the center tap voltage and the bemf voltage, the output of the amplifier being connected to the sample and hold circuit, the sample and hold circuit receiving the amplified voltage and holding it as the sampled voltage.

3. A circuit for detecting a zero-crossing point for a bemf voltage in a multiple-phase synchronous motor including a plurality of coils, the coils being driven by a PWM signal having on-periods and off-periods, the motor having a center tap with a center tap voltage, the bemf voltage being sensed in a selected one of the coils, the circuit comprising:

a sample and hold circuit being coupled to the selected coil during on-periods of the PWM signal to receive the bemf voltage from the selected coil and hold it as a sampled voltage, the sample and hold circuit being isolated from the selected coil during off-periods of the PWM signal to hold the sampled voltage received during on-periods of the PWM signal;

a comparing circuit having first and second inputs, the first input being coupled to the sample and hold circuit to receive the sampled voltage, the second input receiving a reference voltage, the comparing circuit generating a zero-crossing detection signal when the sampled voltage equals the reference voltage; and a slope compensation circuit connected to the sample and hold circuit to reduce the sampled voltage at a selected rate during off-periods of the PWM signal such that the sampled voltage substantially follows the bemf voltage.

4. The circuit of claim 3, further comprising:

a PWM circuit generating the PWM signal; and a window circuit having an input receiving the sampled voltage and an output connected to the PWM circuit, the window circuit generating a signal at its output to force the PWM circuit to generate a PWM signal with an on-period while a difference between the sampled voltage and the reference voltage is less than a selected offset voltage amount.

5. A circuit for detecting a zero-crossing point for a bemf voltage in a multiple-phase synchronous motor including a plurality of coils, the coils being driven by a PWM signal having on-periods and off-periods, the motor having a center tap with a center tap voltage, the bemf voltage being sensed in a selected one of the coils, the circuit comprising:

a sample and hold circuit being coupled to the selected coil during on-periods of the PWM signal to receive the bemf voltage from the selected coil and hold it as a sampled voltage, the sample and hold circuit being isolated from the selected coil during off-periods of the PWM signal to hold the sampled voltage received during on-periods of the PWM signal;

a comparing circuit having first and second inputs, the first input being coupled to the sample and hold circuit to receive the sampled voltage, the second input receiving a reference voltage, the comparing circuit generating a zero-crossing detection signal when the sampled voltage equals the reference voltage;

an amplifier having first and second inputs and an output, the first input being coupled to the center tap to receive the center tap voltage, the second input being coupled to the selected coil to receive the bemf voltage, the amplifier generating at its output an amplified voltage proportional to a difference between the center tap voltage and the bemf voltage, the output of the amplifier being connected to the sample and hold circuit, the sample and hold circuit receiving the amplified voltage and holding it as the sampled voltage;

a sequencer circuit having an output, the sequencer circuit generating a sequencer signal corresponding to the selected coil; and a multiplexer circuit having a plurality of inputs and an output, each of the coils being connected to one of the inputs, the output of the sequencer circuit being connected to one of the inputs to provide the sequencer signal to the multiplexer circuit, the output of the multiplexer circuit being connected to the second input of the amplifier to couple the selected coil to the second input of the amplifier based on the sequencer signal.

6. A method for detecting a zero-crossing point for a bemf voltage and a multiple-phase synchronous motor including a plurality of coils, the coils being driven by a PWM signal having on-periods and off-periods, the motor having a center tap with a center tap voltage, the method comprising the steps of:

isolating a selected one of the coils to render the selected coil tri-stated;

coupling the selected coil to a sample and hold circuit during an on-period of the PWM signal;

sampling a bemf voltage in the selected coil and retaining the sampled bemf voltage;

isolating the sample and hold circuit from the selected coil during an off-period of the PWM signal to hold the sampled bemf voltage;

comparing the sampled bemf voltage with a reference voltage; and generating a zero-crossing detection signal when the sampled bemf voltage equals the reference voltage.

7. The method of claim 6, further comprising the steps of:

amplifying a voltage difference between the bemf voltage in the selected coil and the center tap voltage to generate an amplified voltage; and providing the amplified voltage to the sample and hold circuit, the sample and hold circuit retaining the amplified voltage as the sampled bemf voltage.

8. The method of claim 6, further comprising the step of drawing a regulated current from a capacitor in the sample and hold circuit to reduce the sampled bemf voltage at a regulated rate during off-periods of the PWM signal such that the sampled bemf voltage substantially follows the bemf voltage.

9. The method of claim 6, further comprising the step of generating the PWM signal with an on-period when a difference between the sampled bemf voltage and the reference voltage is less than a selected offset voltage amount.

10. A method for detecting a threshold-crossing of a bemf measured in one phase of a multiple-phase motor, wherein said one phase is set at a high impedance while at least one other phase is supplied by a pulse-width modulation signal, comprising the steps of:

sampling the bemf during on-periods of the pulse-width modulation signal;

holding the bemf during off-periods of the pulse-width modulation signal; and comparing the bemf with a threshold voltage.

11. The method of claim 10 wherein the step of holding the bemf comprises the step of modifying a charge of a capacitor during an off-period of the pulse-width modulation signal, so that a voltage on the capacitor substantially equals the bemf at a beginning of a next on-period of the pulse-width modulation signal.

12. The method of claim 10, further comprising the step of forcing an on-period of the pulse-width modulation signal in a window where the bemf is likely to cross said threshold voltage.

13. The method of claim 12 wherein said window ends at a threshold-crossing detection.

14. The method of claim 12, further comprising the step of using said window only for a first threshold-crossing detection.

15. A control device for a multiple-phase motor, wherein one phase is set at a high impedance for measuring a bemf of the motor while at least one other phase is supplied by a pulse-width modulation signal, the control device including a comparator for detecting the bemf crossing a threshold voltage, the control device comprising:

a sample and hold circuit operative for sampling the bemf during on-periods of the pulse-width modulation signal and holding the bemf during off-periods of the pulse-width modulation signal, said comparator receiving an output of the sample and hold circuit.

16. The control device of claim 15 wherein the sample and hold circuit comprises a sample and hold capacitor, and wherein the control device comprises a circuit for modifying a charge of said capacitor, so that a voltage of the capacitor during an off-period of the pulse-width modulation signal substantially joins the bemf at the beginning of a next on-period of the pulse-width modulation signal.

17. The control device of claim 15 or 16, further comprising:

a window comparator for forcing an on-period of the pulse-width modulation signal in a window where the bemf is likely to cross said threshold voltage.

18. The control device of claim 16 wherein said circuit for modifying the charge comprises a current source connected between the capacitor and a voltage during off-periods of the pulse-width modulation signal.

* * * * *